United States Patent [19]

Thomson

[11] Patent Number: 4,992,807
[45] Date of Patent: Feb. 12, 1991

[54] GRAY SCALE PRINTHEAD SYSTEM
[75] Inventor: Christopher W. Thomson, Etobicoke, Canada
[73] Assignee: Delphax Systems, Randolph, Mass.
[21] Appl. No.: 518,955
[22] Filed: May 4, 1990
[51] Int. Cl.⁵ ............................................. G01D 15/06
[52] U.S. Cl. .................................................. 346/155
[58] Field of Search ...................... 346/155, 76 PH; 358/298

[56] References Cited
U.S. PATENT DOCUMENTS

4,658,275  4/1987  Fujii et al. ...................... 346/155 X
4,697,196  9/1987  Inaba et al. ..................... 346/155 X
4,819,013  4/1989  Beaudet .......................... 346/155 X Primary Examiner—George H. Miller, Jr.
Attorney, Agent, or Firm—Lahive & Cockfield

[57] ABSTRACT

An electrographic printhead assembly comprises first and second sets of electrodes which define an array of crossing regions for generating packets of electric charge. An RF electrode burst actuates a first electrode to generate charge carriers while a varying extraction potential is developed. A second electrode is then activated with one or more control pulses which are synchronized with the RF burst and with selected portions of the varying extraction potential to gate charge carriers from the printhead. This deposits the desired charge level for each dot on an imaging member. The assembly forms a gray scale latent image for printing, and provides enhanced range without requiring higher frequency or longer duration RF bursts.

13 Claims, 5 Drawing Sheets

GRAY SCALE PRINTHEAD SYSTEM

BACKGROUND OF THE INVENTION

The present invention relates to electrographic printers of the type wherein a printhead array generates charge carriers and directs them at a recording or imaging member by the selective activation of crossed, but not necessarily orthogonal, row and column electrodes. It is particularly directed to such printers wherein one set of electrodes is activated with a voltage to function as a source of charge carriers, and a second set of electrodes are activated to extract and accelerate the charge carriers toward a latent imaging member.

Printheads of this type are described in U.S. Pat. Nos. 4,160,257, 4,628,227, and others. In the printheads described more particularly in the aforesaid patents, a set of electrodes are activated with an RF frequency signal of several thousand volts amplitude to create a localized corona or glow discharge region. Lesser control voltages are applied to one or more control electrodes located at or near the discharge region in a manner synchronized with the RF actuation to gate positive or negative charge carriers from the region, and the printhead is biased with respect to a dielectric member to maintain an accelerating field therebetween, thus depositing latent image charge dots on a dielectric imaging member as it moves past the printhead.

In printing devices using this type of printhead, the RF driven corona generation lines extend along the width of the printhead, spanning many of the control electrodes, which cross them at an angle. One commercial embodiment, by way of example, has twenty parallel RF lines, which are crossed by one hundred twenty eight oblique control electrodes, known as finger electrodes. During the time when one RF line is activated, by a burst of approximately five to ten cycles of a one to three MHz drive signal with a peak to peak amplitude of approximately 2700 volts, those finger electrodes which cross the RF line at the desired dot locations are activated to deposit charge dots.

In the conventional drive circuitry for such systems, the RF drive lines are actuated in a fixed sequence independently of the image being printed, while during any given RF line actuation, the number of finger electrodes which are actuated varies in accordance with the pattern being printed. After a slight delay for the RF voltage to ramp up, the designated finger electrodes are turned on to cause charge carriers to pass from the printhead and accelerate toward the drum, belt or other latent imaging member. Specifically, during their "OFF" cycle, each finger is back biased by several hundred volts with respect to the screen voltage; during their "ON" cycle, the finger voltage is switched to approximately the same potential as the screen.

In the original printers of this type, the finger electrodes were switched on for a fixed interval substantially co-extensive with the RF corona generation burst. Such operation produces a fixed amount of charge per actuation. More recently, in U.S. Pat. No. 4,841,313 of Nathan K. Weiner, constructions with a finger pulse of varying duration have been proposed. This operation varies the amount of charge deposited at each dot.

In printheads of the aforesaid type, the positive or negative half-cycles of individual RF waves applied to the RF electrodes generate charge carriers, and thus define a basic quantum of charge which may be deposited as a latent image dot. In order to achieve a reasonable range of gray scale charge values using the control of U.S. Pat. No. 4,841,313 it is therefore necessary to provide a larger number of cycles in each burst of the RF line drive signal. This requires the use of a higher RF frequency, or a greater interval of time, for printing each dot, thus entailing trade-offs either in terms of circuit cost or of machine operating speed.

Accordingly, it is desirable to print gray scale charge levels from a printhead array without increasing the number of cycles in each RF burst or its duration.

It is also desirable to operate a printhead array to achieve gray scale charge levels using a small number of simple control signals.

SUMMARY OF THE INVENTION

It is an object of the invention to provide effective gray scale charge levels from an electrode array printhead.

This is achieved in accordance with the present invention by driving an RF electrode with a burst of RF energy and by developing a varying extraction potential synchronized with the RF burst. A finger electrode is then activated for one or more intervals, in phased relation to the variation of the extraction potential, to gate the desired amount of charge from the printhead. In one embodiment, the finger electrode is activated with a pulse width modulated pulse and the extraction potential is varied monotonically. In another embodiment, the finger electrode is activated with one or more separate short pulses, each synchronized with a particular portion of the extraction potential curve. In yet another embodiment, the finger actuating signal is shifted in width and is offset in time so that charge carriers released by the RF excursions occurring during the RF actuation interval are subject to a several different extraction potentials. In any of these embodiments, the varying extraction potential modulates the total amount of charge constituting one charge dot delivered by the printhead.

BRIEF DESCRIPTION OF DRAWINGS

These and other features of the invention will be understood from the description of prior machines and illustrative embodiments of the invention, taken together with the drawings, wherein.

DETAILED DESCRIPTION OF INVENTION

Figure 1:
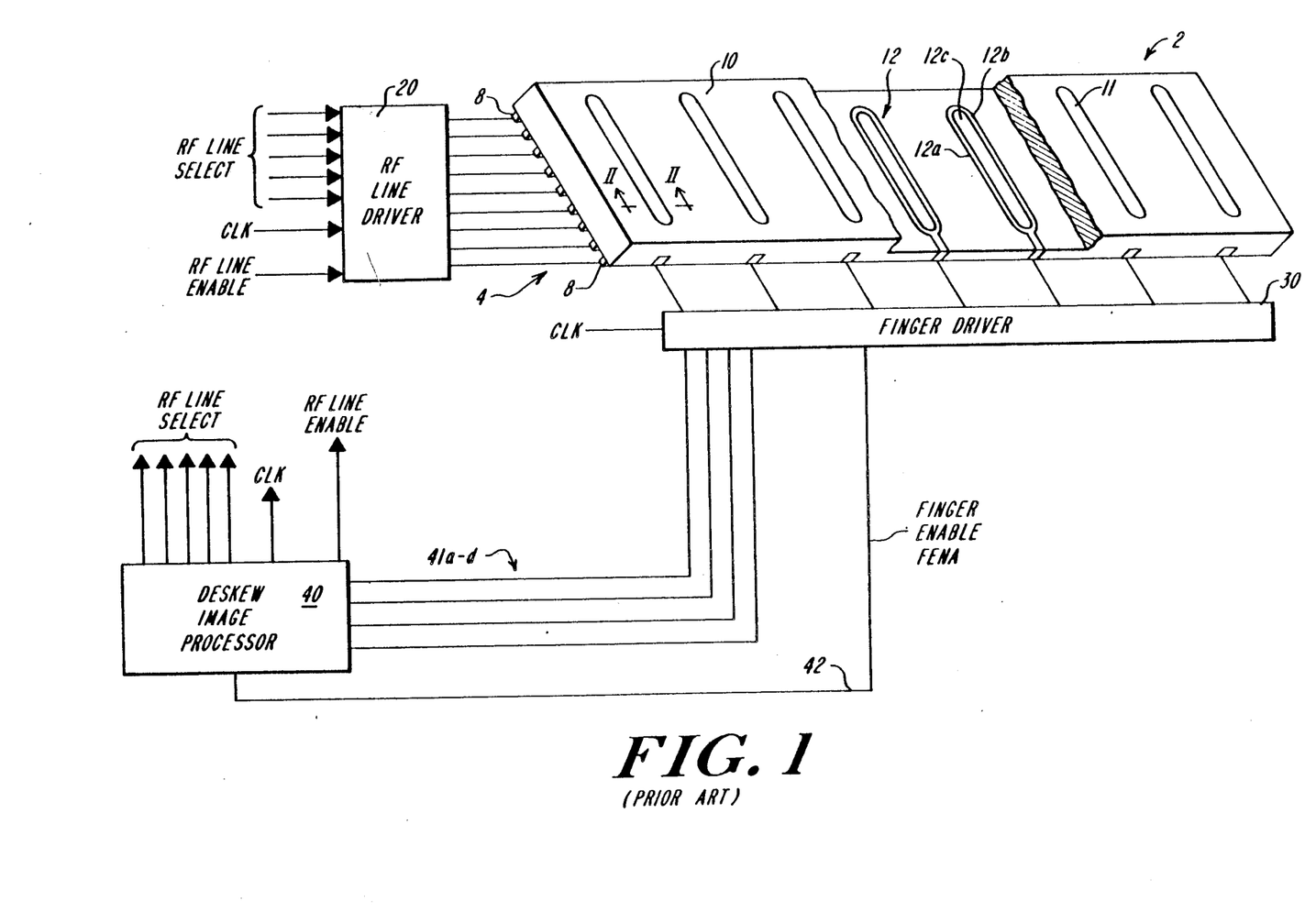
FIGS. 1-3 show a prior art printhead assembly and representative timing, bias and electrode actuation signals.

FIG. 1 shows by way of background a schematic representation of a prior art electrographic latent imaging unit 1 including a controllable printhead 2 having a first electrode set 4 consisting of a plurality of individual corona generating RF inducer electrodes 8 which extend along the length of the printhead.

A front electrode plane 10, or individual screen electrodes of a type known in the art, extends along the front surface of the printhead, which in operation is spaced across a small gap from a dielectric imaging member such as a drum or belt (not shown). The front electrode plane 10 is maintained at a fixed potential intermediate the nominal RF line center voltage and the potential of the dielectric imaging drum or belt. A plurality of individual finger electrodes 12 are located at an intermediate level of the printhead between the RF inducer electrode lines 8 and the screen electrode 10. Each finger electrode is toggled between different voltages to selectively gate charge carriers out of a corona region at the crossing of the finger electrode and an actuated RF line passing transversely below it.

Figure 1A:
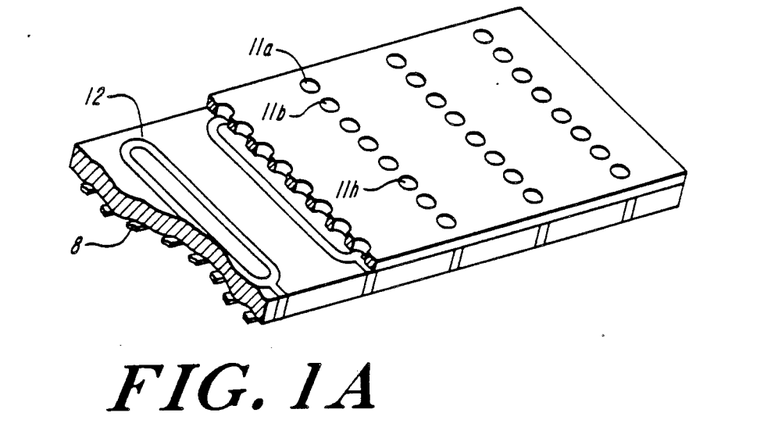

The illustrated finger electrodes 12 have parallel conductive arms or tines 12a, 12b each straddling a central slot 12c. An aperture which is shown as a slot opening 11 in the screen electrode 10 and in the intermediate insulating layer of the printhead is aligned over each slot 12c and extends down to the finger electrode 12. The fingers are oriented obliquely to the RF lines, so that the nominal dot spacing achieved in this manner is equal to the pitch of the finger electrode divided by the number of RF lines. This is clearly visible in an alternative construction illustrated in FIG. 1A wherein a plurality of small holes 11a, 11b ... 11h ... are aligned over each crossing of the RF electrodes 8, with each hole defining the position corresponding to one charge dot. For example, each finger electrode may control twenty holes 11i, one above each RF electrode 8.

With this electrode geometry, since dots with different horizontal offsets are generated by different RF electrodes, complex image encoding and timing control are necessary to activate the different electrodes in an appropriate order to print a straight line or a geometrically correct image. This control function is accomplished by a deskew board 40 which provides synchronizing, line selection and enable signals to effect the particular order and timing offset of the various electrode driving signals necessary to compensate for the oblique electrode geometry of the printhead, and to print geometrically correct images. The deskew board 40 controls an RF line driver 20 and a finger electrode driver 30.

The RF line driver 20 includes multiple high voltage RF signal generators, one connected to each line 8 to provide the corona generation burst to each of the RF lines. The finger driver circuit 30 includes an intermediate potential gate voltage power supply and corresponding multi-line power switching circuitry to switch the finger electrodes between back-biased and level-based states. This finger driver 30 provides timed bias voltage signals to each of the 128 finger electrodes. Each of the drivers 20, 30 receives corresponding electrode selection, timing and/or enable signals from the deskew board 40. The driver circuits also receive a 2.5 MHz system clock signal which is used to coordinate various internal circuit steps of switching, latching and shifting data or control signals.

In this prior art device, four parallel lines 41a-d each provide a high or low finger selection signal which is clocked into a corresponding 32-bit shift register. After 32 clock cycles, 128 finger selection signals are loaded into registers for selecting which of the 128 finger electrodes are to be actuated. A finger enable signal FENA synchronized with the RF burst then appears on line 42 and the drive circuit 30 switches the finger state of all the selected fingers.

Figure 2:
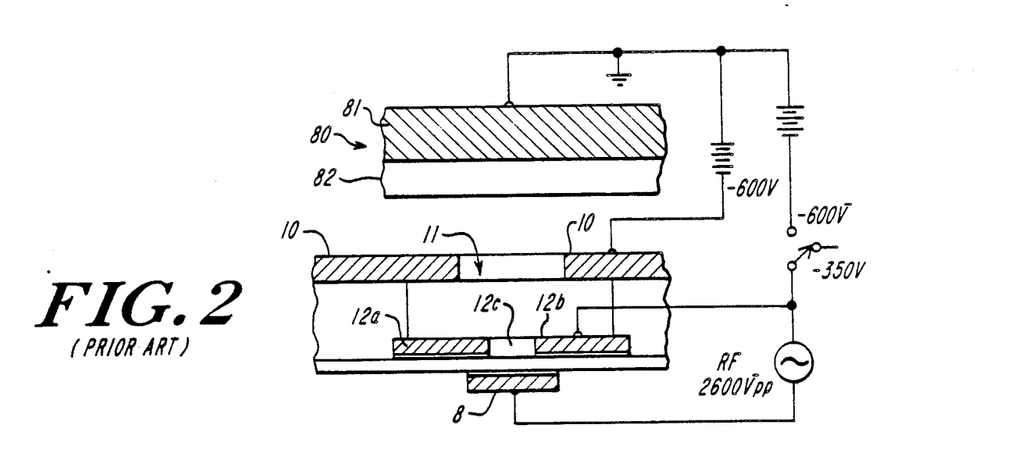

FIG. 2 is a sectional view taken along line II—II of FIG. 1, showing the structure of one electrode crossing or dot generator of the printhead array. The latent imaging member 80, which may be a moving belt or drum, is shown spaced across from the opening 11 to receive accelerated charge carriers, e.g., ions or electrons, from the printhead. Imaging member 80 comprises a non-conductive dielectric surface layer 82 which receives the latent charge image, and a conductive inner layer 81 which is grounded and functions as a counter-electrode. For printing with negative ions or negative charge carriers, the screen electrode 10 is biased to approximately minus 600 volts with respect to conductive layer 81, and a 2600 volt peak to peak RF signal burst is periodically applied between RF line 8 and finger electrode 12. As the member 80 is moved, the finger electrode is toggled between an OFF, or non-printing, state in which it is back biased to a potential approximately 250 volts positive of the screen, and a ON, or printing, state in which it is placed at a potential approximately equal to that of the screen. In the latter state, negative charge carriers generated in region 12c at the bottom of opening 11 are accelerated from the opening and projected toward member 80.

Figure 3:
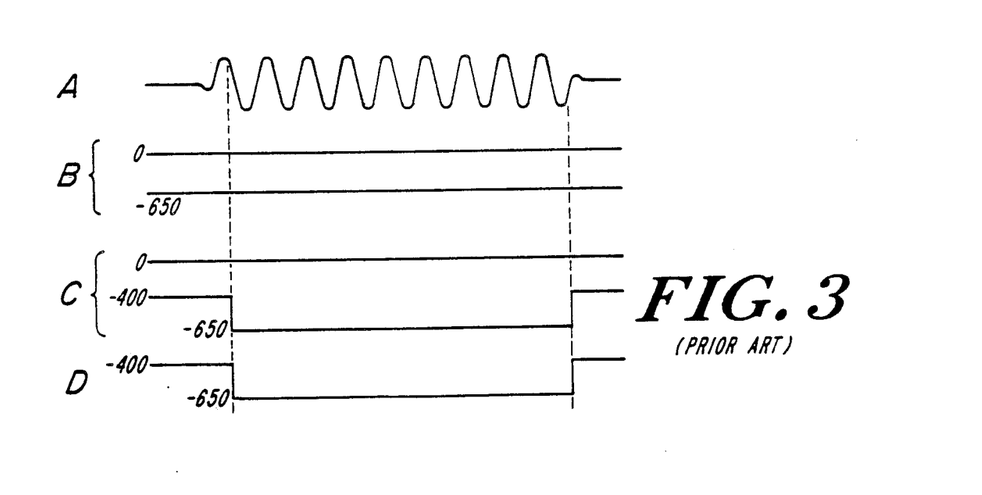

FIG. 3 illustrates the form and timing of electrode driving and control signals of the prior art printhead operated for printing a negative charge latent image. Line A shows the RF signal burst applied to the corona-inducing electrode 8. Line B shows the screen voltage. For the illustrated printhead with a single screen electrode 10 in the form of a front electrode plane, this signal is a constant minus 650 volt potential with respect to the grounded counter-electrode 81. Line C illustrates the signal applied to a finger electrode to pass negative charge carriers from the holes 11. This signal toggles between the screen potential and a potential which is several hundred volts positive of the screen potential. As shown, the finger electrode signal, Line C is constant for an interval substantially coextensive with the RF burst, Line A. However, as noted in the aforesaid U.S. Pat. No. 4,841,313, when operated to print halftones or gray scale, the signal may have a shorter duration, coextensive with less than all of the RF cycles. Effectively, the screen voltage, Line B, serves to screen the printhead corona region from the large potential difference of the counter-electrode and prevent the extraction of charge from non-activated holes, while toggling of the finger electrode back bias (Line D) measured with respect to the screen, gates charge carriers from the printhead.

Figure 4:
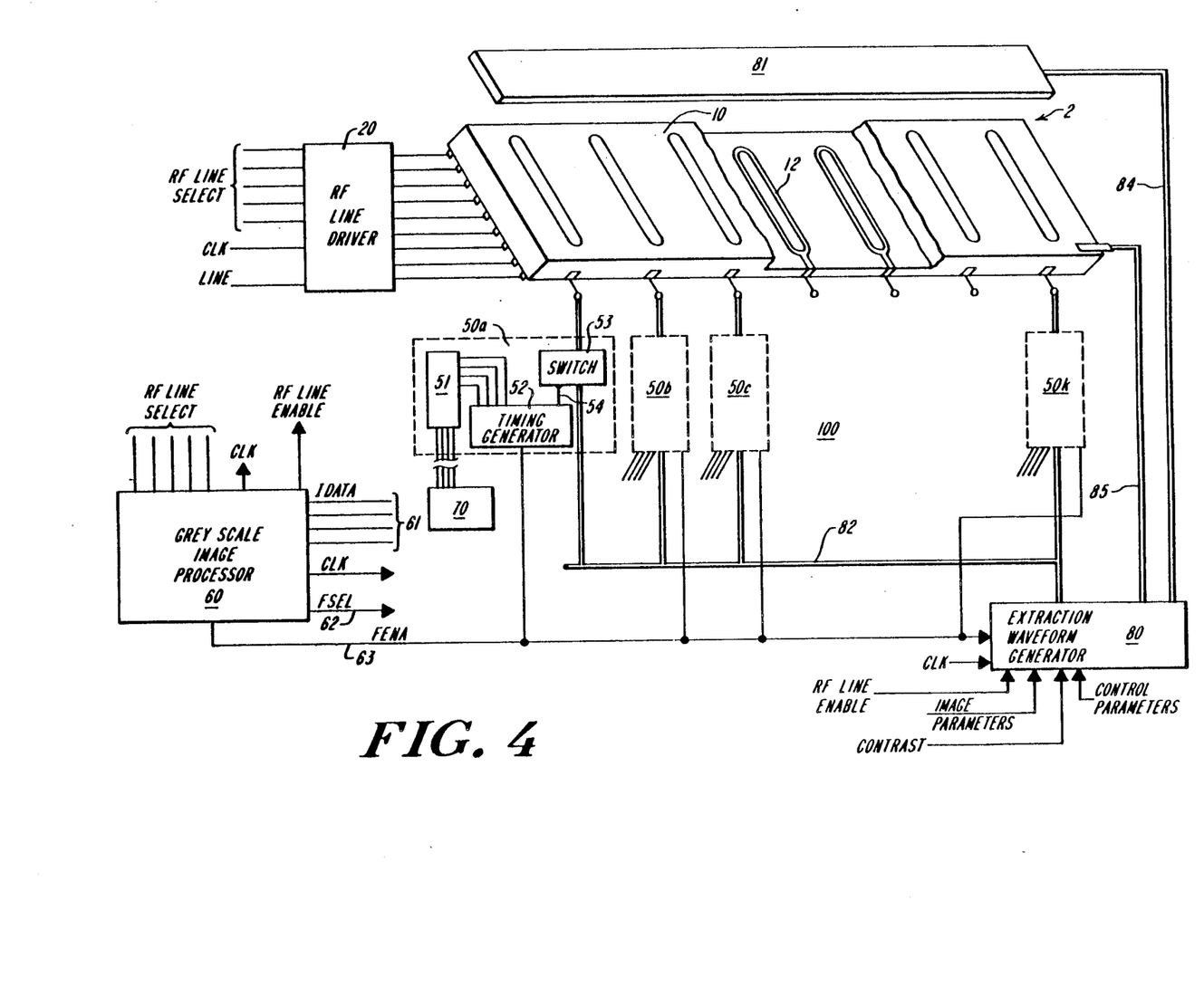
FIG. 4 shows a printhead control system in accordance with the present invention.

FIG. 4 shows a printing system in accordance with the present invention, wherein the printhead 2 and RF line driver 20 are substantially identical to those of FIG. 1.

In this embodiment, however, the deskew board 40 of FIG. 1 has been replaced by a gray scale image processor 60 which provides gray scale intensity data on lines 61 for each finger identified by finger selection signals FSEL on line 62. The intensity data may, for example, specify a four bit control word indicative of a gray scale level between 1 and 16. As the signals are clocked out, a distribution circuit 70 sends the finger state selection and intensity value to a corresponding finger drive unit 50a ... 50k connected to one of the finger electrodes 12. The finger drive units, all of which are preferably fabricated on a single or at most of few monolithic chips, each receive and store their state and intensity data in a finger register 51 which communicates with a logic decoder and timing generator 52, the output of which is discussed further below.

An extraction waveform generator 80 is a specialized power supply adopted to generate a variable potential extraction waveform which is synchronized with the RF bursts and determines the Potential difference between electrodes 10 and 12. The generator 80 receives at least one of the RF line enable and the finger enable signals, and generates a waveform which varies in a known way over the duration of an RF burst. The potential is referenced to that of electrode 10 via line 85, and is impressed on a bus 82 that connects to each driver unit 50a, 50b ... 50k.

Within each driver unit 50i, a switch 53 such as a power switching transistor selectively interconnects bus 82 to its finger electrode when activated with a control signal along line 54 from its logic and timing generator 52. Thus, the intensity data provided along lines 61 to finger data register 51 is converted by the logic and timing generator 52 into appropriately timed control signals for applying the voltage of bus 82 to the finger electrode.

In addition, the extraction waveform generator 80 preferably also controls the potential applied to counter-electrode 81 to vary the potential difference between the screen 10 and the counter-electrode. For this purpose the waveform generator may receive image-related parameters as well as contrast and other control signals related to the overall machine operating conditions, to determine the potential which it applies between lines 85 and 84. Thus one or both of the finger/-screen and the screen/counter-electrode potential differences are varied by generator 80 to change the rate and effective amount of charge transport achieved by charge carriers passed by the finger electrodes.

Accordingly, the term "extraction potential", as used in this disclosure and in the claims appended hereto, shall be understood to mean either of these potentials or a combination of the two.

Figure 5:
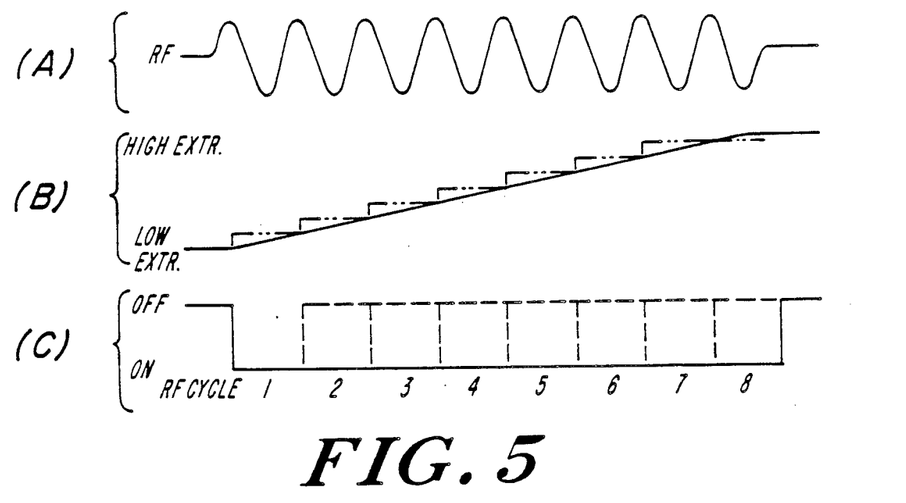
FIGS. 5-7 illustrate different printhead control signals applied by the system of FIG. 4.

FIG. 5 shows the operative control signals of the generator 80 and timing generator 52 and their relation to the corona-generating RF line burst. Once the finger data for all fingers has been sent to the appropriate register in a drive unit 50, the RF burst, Line A, is initiated by the RF line enable signal from the deskew board and the waveform generator responds to the same enable signal or to the finger enable signal to produce a quickly changing potential (Line B) which may be either a continuous ramp as indicated in the solid graph or a step function, as indicated in the dashed graph. In either case, the illustrated potential varies monotonically over a range between a first level which is approximately equal to the normal back-biased OFF level, and a second level which is approximately equal to the screen voltage. The timing generator on the other hand puts out a strictly bi-level signal Line C, corresponding to the normal finger pulse, which turns on switch 53 for an interval which includes one or more cycles of the RF burst. Different possible durations of the finger turn on signal are shown by dashed lines.

Figure 6:
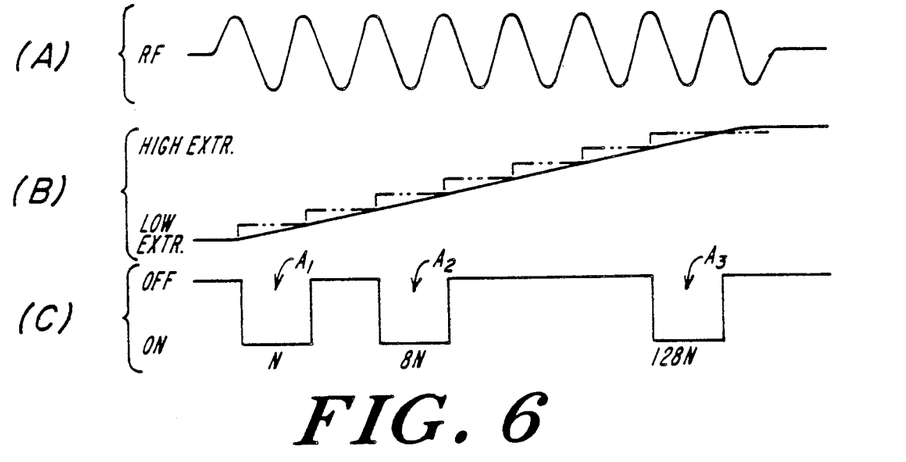

FIG. 6 illustrates another set of electrode signals in accordance with a second embodiment of the invention. The RF actuation signal Line A is identical. The extraction potential Line B is again a varying signal which varies between a back biased blocking voltage and a voltage level which allows charge carriers to be accelerated out of the printhead electrode 10. The finger pulse (Line C), corresponding to the timing control signals on line 54, in this case consists of a plurality of separate pulses $A_1$, $A_2$, $A_3$ which may be simply generated with elementary logic and decoding elements in the timing generator 51. Each of the pulses is located under, i.e., is synchronous with, a different potential region of the extraction voltage curve, Line B, and each of the separate pulses has the same width. However, due to the greatly differing effects of the associated extraction potentials, each pulse gates a different amount of charge, shown as 1, $2^3$ and $2^7$ times a basic quantum.

Thus, the dynamic range achievable by this circuit greatly exceeds that of a simple on-off pulse at a fixed finger bias.

Figure 7:
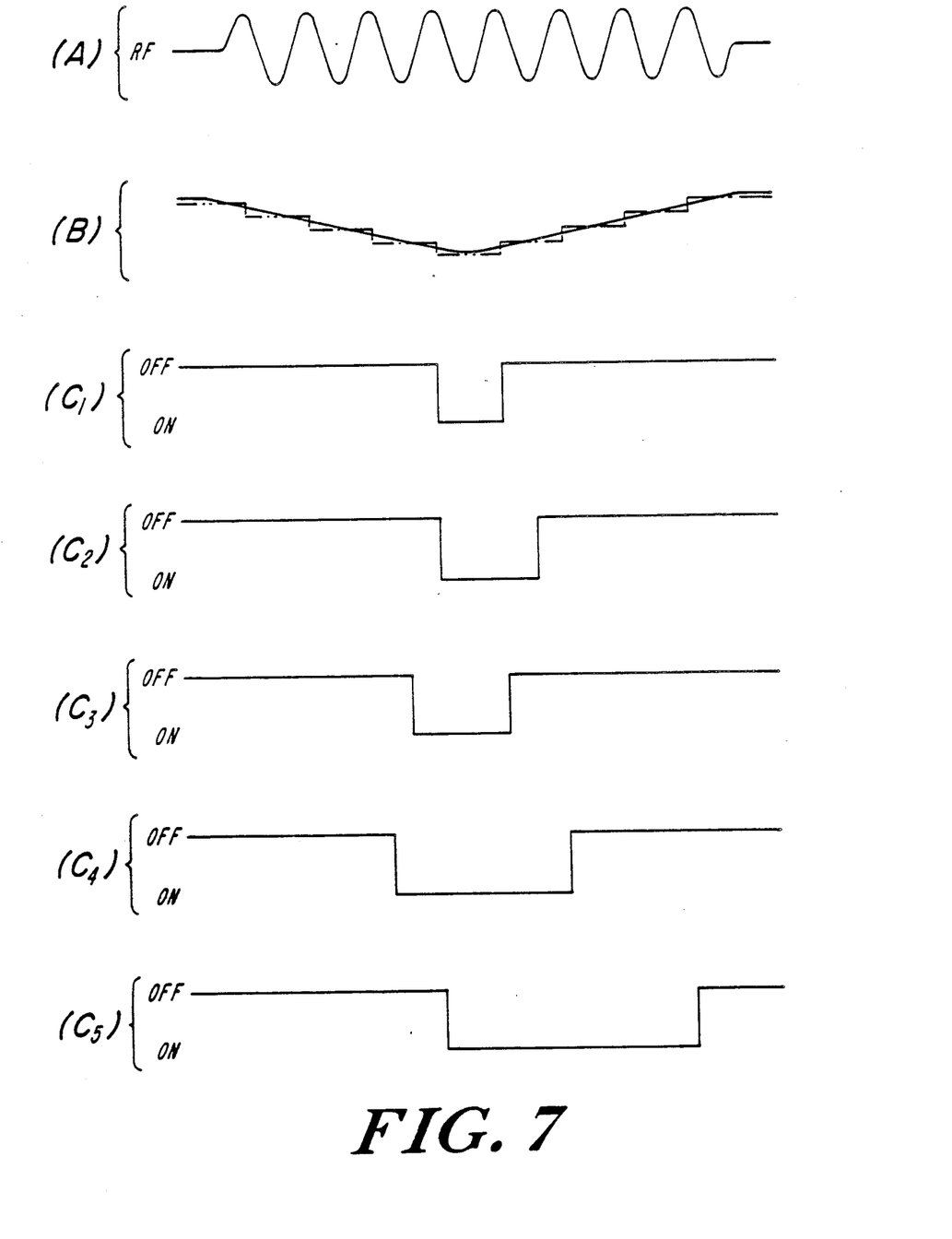

FIG. 7 illustrates other electrode and control signals in accordance with an additional embodiment of the invention. As before, the RF line actuation signal, Line A, consists of a fixed number of identical cycles of an RF signal. The extraction waveform generator 80 produces a varying signal illustrated as a symmetrical dip (continuous curve) or double staircase (dashed curve) and the timing generator generates a single pulse Line $C_1$-$C_5$ which varies in width and time to apply a selected portion of the waveform to the finger electrode 12. Line $C_1$ illustrates a minimal charge unit, achieved by applying a minimal width pulse centered at the minimum of the extraction potential waveform. Lines $C_2$ and $C_3$ show control signals for depositing greater amounts of charge, obtained by advancing the leading edge or retarding the trailing edge of the control signal on line 54. Lines $C_4$ and $C_5$ show control signals for developing even greater amounts of charge. These waveforms may be generated by a combination of pulse width modulation and phase shifting of the applied signals.

In this latter illustrated embodiment, it is not necessary that the waveform be a substantially symmetric one with a central minimum value, and other waveforms such as double staircase, monotone non-decreasing, or monotone non-increasing waveforms may be used. However, in view of the possibilities that the RF line may fail to generate a corona during the initial RF cycles, it is deemed desirable to provide a minimum extraction voltage at a time at least several RF cycles after the start of the RF burst so that light tones are not lost altogether. For like reasons, it is preferred that the high extraction end of the potential curve not occur solely during the initial RF cycles. Thus, a "valley" or a "ramping up" potential shape is preferred.

This completes a description of a printing system and printhead controller according to the present invention, which has been illustrated by reference to ionographic printers of known construction. It will be understood that the description of timing and control details of the illustrated embodiments is intended as illustrative of the principles and operation of the invention, but is not intended to limit its scope and application. The salient features of the invention being thus disclosed, variations and modifications thereof will occur to those skilled in the art for adapting the invention to diverse imaging systems, and all such variations and modifications are considered to be within the scope of the invention, as defined by the claims appended hereto.

What is claimed is:

1. A printhead assembly for effecting a write operation by depositing a pointwise charge distribution on a dielectric member, and comprising a printhead and a printhead controller, said printhead including for each pixel an array of electrode structures including a first electrode structure for forming a charge breakdown region from which charge carriers may be accelerated, a third electrode structure impressed with an extraction potential for accelerating charge carriers from the charge breakdown region, and a second electrode structure interposed between the first and third electrode structures for controlling the extraction of said charge carriers, said first electrode structure receiving an actuating signal during a write operation for the pixel, and said controller including means for applying between said second and third electrode structures a varying potential which changes in voltage level during the duration of said actuating signal, and means for providing a gating voltage for said second electrode structure synchronized with said actuating signal and with said varying extraction potential to cause a selected amount of charge to be deposited by the printhead assembly on the dielectric member.

2. A printhead assembly according to claim 1, wherein said means for providing a gating voltage provides a pulse which is off set in phase from said actuating signal.

3. A printhead assembly according to claim 2, wherein said means for providing a gating voltage applies a pulse width modulated pulse.

4. A printhead assembly according to claim 2, wherein said means for providing a gating voltage applies different numbers of pulses for achieving different levels of charge extraction, each said pulse being synchronized with said actuating signal.

5. A printhead assembly according to claim 1, wherein said means for applying a varying potential applies a multi-level step potential.

6. A printhead assembly according to claim 1, wherein said means for applying a varying potential applies a ramp potential.

7. A printhead assembly according to claim 1, wherein said means for applying a varying potential applies a monotonically-varying potential.

8. A system for printing a gray scale image comprising
a dielectric member
means for applying toner to charged regions of the dielectric member to form a tone image
means for transferring the toned image to a recording member, and
a printhead assembly for effecting a write operation by depositing a pointwise charge distribution on the dielectric member, such assembly comprising a printhead and a printhead controller, wherein the printhead includes for each pixel an array of electrode structures including a first electrode structure for forming a charge breakdown region from which charge carriers may be accelerated, a third electrode structure impressed with an extraction potential for accelerating charge carriers from the charge breakdown region, and a second electrode structure interposed between the first and third electrode structures for controlling the extraction of said charge carriers, said first electrode structure receiving an actuating signal during a write operation for the pixel, and said controller including means for providing between said second and said third electrode structures a varying potential which changes in voltage level during the duration of said actuating signal, and means for providing a gating voltage for said second electrode structure synchronized with said actuating signal and with said varying potential to cause a selected amount of charge to be deposited by the printhead assembly on the dielectric member thereby forming a charge varying latent image that when toned and transferred to the recording member is a gray scale image.

9. A printhead assembly for effecting a write operation by depositing a pointwise charge distribution on an imaging member, and comprising a printhead and a printhead controller, said printhead including for each pixel an array of electrode structures including a first electrode structure for forming a charge breakdown region from which charge carriers may be accelerated, a third electrode 10. A Printhead assembly according to claim 9, wherein the third electrode structure includes a screen electrode, and the extraction control means applies a varying extraction potential between the second electrode structure and the screen electrode.

11. A printhead assembly according to claim 9, wherein the third electrode structure includes a screen electrode on said printhead and a counter-electrode located to apply an accelerating field from the printhead to the imaging member, and wherein the extraction control means includes means for varying the potential between the screen electrode and the counter-electrode.

12. A printhead assembly according to claim 11, wherein the extraction control means further includes means for varying the potential between the second electrode structure and the screen electrode.

13. A printhead assembly according to any of claims 9-12, wherein said means for providing a gating voltage provides a train of one or more pulses varying in at least one of pulse width, and phase with respect to said varying extraction potential.

* * * * *

UNITED STATES PATENT AND TRADEMARK OFFICE
CERTIFICATE OF CORRECTION

PATENT NO. : 4,992,807

DATED : February 12, 1991

INVENTOR(S) : Christopher W. Thomson

It is certified that error appears in the above-identified patent and that said Letters Patent is hereby corrected as shown below:

Column 8, line 27, after "electrode" please insert --structure impressed with an extraction potential for accelerating charge carriers from the charge breakdown region, and a second electrode structure interposed between the first and third electrode structures for controlling the extraction of said charge carriers, said first electrode structure receiving an actuating signal during a write operation for the pixel, and said controller including extraction control means for applying an extraction potential which changes in level during the duration of said actuating signal such that extracted charge carriers transport varying amounts of charge, and means for providing a gating voltage for said second electrode structure synchronized with said actuating signal and with said varying extraction potential so that a selected amount of charge is deposited by the printhead assembly on the imaging member.--.

Signed and Sealed this

Fourth Day of August, 1992

Attest:

DOUGLAS B. COMER

Attesting Officer

Acting Commissioner of Patents and Trademarks